Patented Dec. 14, 1948

2,456,231

UNITED STATES PATENT OFFICE 2,456,231

CHLORINE-CONTAINING VINYL RESINS STABILIZED WITH A TRI-(2-ALKENYL)-PHOSPHITE

Richard H. Wiley, Chapel Hill, N. C., assignor to E. I. du Pont de Nemours & Company, Wilmington, Del., a corporation of Delaware No Drawing. Application February 4, 1948, Serial No. 6,341

11 Claims. (Cl. 260—78.5)

This invention relates to chlorine-containing vinyl resin compositions and to methods for preventing or retarding their discoloration by heat or light. More specifically this invention relates to chlorine-containing vinyl polymers and copolymers showing improved resistance to discoloration on exposure to the action of heat or light and to methods for their preparation.

In many applications of chlorine-containing vinyl polymers, as for example vinyl chloride polymers and copolymers, it is necessary to subject the vinyl resin to elevated temperatures to permit formation into various products. These vinyl resins tend to decompose somewhat on heating which decomposition is generally recognized by the development of color. Even though slight decomposition on heating may not detract to any appreciable extent from the physical properties of the resin, the discoloration seriously restricts its use in many applications. The use of these resins is further restricted due to discoloration and embrittlement which takes place on exposure to light. Heretofore, a wide variety of materials have been disclosed to function as stabilizers for chlorine-containing vinyl resins by minimizing discoloration on exposure to heat or light. However, such stabilizers have not been entirely saitsfactory, particularly in preventing discoloration of vinyl chloride resins due to light.

This application is a continuation-in-part of my application Serial No. 694,165, filed August 30, 1946, now abandoned.

It is an object of this invention to provide chlorine-containing vinyl resin compositions showing improved resistance to discoloration on exposure to the action of heat and light. A further object of this invention is to provide a method for preventing or substantially retarding the discoloration of vinyl chloride resin compositions on exposure to heat and light. A still further object is to provide polymers and copolymers of vinyl chloride stabilized against decomposition by heat or light. Other objects will appear hereinafter.

These objects are accomplished by the preparation of compositions of matter comprising a chlorine containing vinyl resin of 14–75% by weight chlorine and having the chlorine attached directly to the carbon atoms in the polymer chain, and from 1 to 6% by weight, based on the resin, of a tri-(2-alkenyl)-phosphite having 3–14 carbons in each alkenyl group. Thus, for example, a milled sheeting of vinyl chloride resin stabilized with 5% of triallyl phosphite can be obtained in perfectly colorless condition and shows remarkable resistance to discoloration on outdoor exposure.

Examples of tri(2-alkenyl)phosphites include tri-(2-propenyl)phosphite (triallyl phosphite), tri(2-methyl-2-propenyl)phosphite (trimethallyl phosphite), and tri(2-butenyl)phosphite (tr.crotonyl phosphite). The tri(2-alkenyl)phosphites containing 3 to 4 carbon atoms in each alkenyl group and having a terminal $CH_2=C$ group in each alkenyl group are preferred for use in this invention.

The stabilized chlorine-containing vinyl resin compositions of this invention are prepared by adding to the chlorine-containing vinyl polymer the tri(2-alkenyl)phosphite. Any convenient method may be employed to incorporate the stabilizer in the chlorine-containing vinyl polymers. However, best results are obtained by mixing the polymers, for example those resulting from the polymerization of vinyl chloride, or from the conjoint polymerization of vinyl chloride and another polymerizable monomer, with the stabilizer, for example 3% of a tri(2-alkenyl)phosphite, with or without the aid of a volatile solvent and the resulting mixture milled on rolls at 100° to 160° C. until completely homogenized. It is not desirable to continue milling any longer than required to homogenize the mixture since long milling will cause some discoloration of the resin. It is therefore advantageous to mix the resin and stabilizer thoroughly before milling. The stabilized resin is removed from the mill in the form of a sheet of the desired thickness and may be used as such or subjected to a polishing treatment. It is particularly desirable to remove the sheeting from the mill at a temperature of about 145° to 160° C., since at lower temperatures the sheeting obtained is somewhat brittle.

Polished films are readily prepared by heating the milled sheet, under pressure, between highly polished plates. Although the optimum temperature for polishing varies with the type of resin being used, in general it is preferred to employ a temperature of about 150° to 160° C. and a pressure of about 250 to 500 lbs./sq. in.

Stabilized sheeting, obtained by milling the resin and stabilizer, may also be chopped into the desired size for injection molding purposes. This milling precedure is readily adaptable to the preparation of stabilized vinyl chloride resin compositions containing plasticizer, pigment, dye and the like, which may then be used for lacquers, spinning of fibers, film casting and fabric coatings.

Another method of incorporating the stabilizer of this invention is to make a thick slurry of the resin with some liquid which is a nonsolvent for the polymer and an inert solvent for the stabilizer. Suitable solvents include diethyl ether, aliphatic hydrocarbons, preferably those having low boiling points, and the lower aliphatic alcohols, where excessive heating can be avoided. The solvent is allowed to evaporate leaving the stabilizer uniformly distributed over the polymer. This drying operation is conveniently carried out in a rotary drier.

In certain instances, it may be desirable to prepare the stabilized chlorine-containing vinyl resin compositions of this invention by adding the stabilizer to the polymer dispersion as it is obtained from the polymerization vessel in accordance with the process described in the patent application of H. W. Arnold, Serial No. 427,921, filed January 23, 1941, now Patent No. 2,404,780. In this process care should be used in selecting the unsaturated phosphite since the lower members of the series are somewhat hydrolyzed by water. The dispersion is filtered to remove any large lumps of resin and then coagulated by freezing or by the addition of an electrolyte, such as sodium chloride or aluminum sulfate solution. The precipitated polymer is washed with water to remove residual surface active agents and dried.

The process of this invention is generally applicable to any chlorine-containing vinyl polymer containing 14–75% chlorine and having the chlorine attached to the carbons of the polymer chain. For example polymers obtained by the polymerization of vinyl chloride with or without the addition of a monomer copolymerizable therewith can be stabilized against the discolorizing action of heat and light by means of the process of this invention.

This invention is further illustrated by the following examples in which parts are given by weight, unless otherwise specified.

*Example I*

A mixture comprising 100 parts of the copolymer obtained by polymerizing a mixture of vinyl chloride and diethyl fumarate, in the ratio of 1 of the latter to 19 of the former, and 5 parts of triallyl phosphite is thoroughly mixed and homogenized by working on a roll mill heated at 145° C. for three minutes. The composition thus produced is removed in the form of a colorless sheet. A polished film is prepared by heating this sheeting between highly polished chromium plates at 150° C. under 300 lbs./sq. in. pressure for one minute. The colorless sheeting thus obtained remains perfectly colorless after three months' summer exposure. A similar film prepared without the addition of triallyl phosphite is initially discolored to a dirty gray which develops into a deep red in two months' outdoor summer exposure.

*Example II*

One hundred parts of chlorinated polyethylene (containing approximately 27% chlorine by weight) and 2 parts of triallyl phosphite are thoroughly mixed on rolls heated at 150° C. for three minutes. The resulting composition is removed from the rolls in the form of a slab. A sample of this slab is molded into a disc at 150–160° C. and 2,000 lbs./sq. in. for ten minutes. A similar sample of chlorinated polyethylene containing no triallyl phosphite was molded into a disc under the same conditions. The molded disc containing triallyl phosphite was only pale yellow in color, whereas that of the control sample containing no stabilizer was dark brown.

A sample of both the stabilized and unstabilized chlorinated polyethylene was cut from each of the rolled slabs and subjected to a heat stability test at 180° C. in an atmosphere of air for 2 hours. The air was swept over the sample in place of the more conventional nitrogen in order to provide more extreme conditions for testing the stability of the resin. At the end of 2 hours the amount of acid (mostly hydrogen chloride) liberated from the sample was measured by titration with standard alkali and expressed as milligrams of hydrogen chloride evolved per gram of resin. The chlorinated polyethylene sample containing triallyl phosphite evolved 4.5 milligrams, whereas the unstabilized control sample evolved 7.0 milligrams measured under the same test conditions.

In addition to the copolymers of vinyl chloride with diethyl fumarate, copolymers of vinyl chloride with dimethyl, di-n-butyl, di-isobutyl, di-cyclohexyl, dibenzyl, di(chloroethyl) fumarate or maleate, and copolymers of vinyl chloride with the di-esters of fumaric or maleic acid with methoxy-, ethoxy-, or butoxyethanol may be used for the preparation of the compositions of this invention. Copolymers containing from 80 to 97% of vinyl chloride with 3 to 20% of an ethylene dicarboxylic acid ester, particularly a diester of fumaric acid or a di-ester of maleic acid are preferred copolymers for use in this invention. There may also be employed copolymers of vinyl chloride with vinyl esters of organic acids such as vinyl acetate and vinyl propionate, containing 80 to 97% of vinyl chloride, copolymers of vinyl chloride and vinylidene chloride, and copolymers of vinyl chloride with acrylates, such as methyl acrylate, ethyl acrylate and butyl acrylate, and also copolymers of vinyl chloride with methacrylates, such as methyl methacrylate, ethyl methacrylate, and butyl methacrylate, containing from 80 to 97% of vinyl chloride. In general, copolymers of vinyl chloride with one other ethylenically unsaturated compound, which contain 80-97% vinyl chloride can be stabilized in accordance with this invention.

The polymers and copolymers of vinyl chloride may be prepared by any of the processes well known in the art. Suitable methods include polymerization in aqueous emulsion, in solution, in ketonic solvents, in hydrocarbon nonsolvents for the resins, such as n-hexane, and also in the absence of solvents and nonsolvents.

A wide variety of catalysts may be used to accelerate the polymerization. Such catalysts as sodium, potassium or ammonium persulfate are preferred for preparing the resin by an aqueous emulsion process. Acyl peroxide, such as benzoyl peroxide, lauroyl peroxide, acetyl peroxide, and also hydrogen peroxide may be used. In the preparation of the resins by the polymerization of the monomer or monomers in aqueous emulsion, it is desirable to use surface-active agents, a procedure which is well known in the art.

Chlorinated polyethylenes having chlorine contents varying from about 14% to about 75% chlorine by weight may also be used for the preparation of the compositions of this invention. The chlorinated polyethylenes may be prepared by chlorinating polyethylenes of various molecular weights in solution or in aqueous suspension as described in U. S. P. 2,183,556 to Fawcett and in the patent application of Robert S. Taylor, Ser. No. 686,149, filed July 25, 1946.

The unsaturated phosphites are readily prepared from phosphorus trichloride and the desired alcohol by carrying out the reaction in the presence of a hydrogen chloride acceptor, such as pyridine or dimethyl aniline, with ether or benzene as the reaction medium. A suitable process is described by Milobendzki and Sachnowski (Chem. Abs., 13, 2865 (1919)). Unsaturated alcohols that may be used for the preparation of the unsaturated phosphites having 3 to 14 carbons in each alkenyl group include among others allyl, methallyl, crotonyl, tiglyl and cinnamyl alcohols, hexadiene-2,4-ol-1, octatriene-2,4,6-ol-1, 3,7-dimethyloctadiene-2,7-ol-1, 2-ethylhexene-2-ol-1 and 2-amylnonene-2-ol-1. Caution should be exercised in the preparation of these compounds since some of them tend to decompose vigorously at elevated temperatures. Those unsaturated phosphites derived from high boiling alcohols are preferably purified by a washing procedure.

The compositions of this invention can be used for preparation of molding powders, coatings for metals and fabrics, films and foils. If desired, the chlorine-containing vinyl resin composition stabilized according to the process of this invention may be combined with or prepared in the presence of plasticizers, dye softeners or other synthetic resins.

As many apparently widely different embodiments of this invention may be made without departing from the spirit and scope thereof, it is to be understood that I do not limit myself to the specific embodiments thereof except as defined in the appended claims.

I claim:
1. A composition of matter comprising a chlorine-containing vinyl resin of 14 to 75% by weight chlorine in which the chlorine is attached directly to the carbon atoms in the polymer chain and from 1 to 6% by weight, based on said resin, of a tri-(2-alkenyl)phosphite having 3 to 14 carbons in each alkenyl group.

2. A composition of matter comprising a chlorine-containing vinyl resin of 14 to 75% by weight chlorine in which the chlorine is attached directly to the carbon atoms in the polymer chain and from 1 to 6% by weight, based on said resin, of a tri-(2-alkenyl)phosphite in which each alkenyl group contains 3 to 4 carbon atoms and has a terminal $CH_2=C$ group.

3. A composition of matter comprising a chlorine-containing vinyl resin of 14 to 75% by weight chlorine in which the chlorine is attached directly to the carbon atoms in the polymer chain and from 1 to 6% by weight, based on said resin, of triallyl phosphite.

4. A composition of matter comprising a vinyl chloride polymer and from 1 to 6% by weight, based on said polymer, of a tri-(2-alkenyl)phosphite having 3 to 14 carbons in each alkenyl group.

5. A composition of matter comprising a vinyl chloride polymer and from 1 to 6% by weight, based on said polymer, of a tri-(2-alkenyl)phosphite in which each alkenyl group contains 3 to 4 carbon atoms and has a terminal $CH_2=C$ group.

6. A composition of matter comprising a vinyl chloride polymer and from 1 to 6% by weight, based on said polymer, of triallyl phosphite.

7. A composition of matter comprising a chlorine-containing vinyl resin and from 1 to 6% by weight, based on said resin, of a tri-(2-alkenyl)-phosphite having 3 to 14 carbons in each alkenyl group, said chlorine-containing vinyl resin consisting of a copolymer of 80 to 97% vinyl chloride and 3 to 20% of an ethylene dicarboxylic acid ester.

8. A composition of matter comprising a chlorine-containing vinyl resin and from 1 to 6% by weight, based on said resin, of a tri-(2-alkenyl)-phosphite in which each alkenyl group contains 3 to 4 carbon atoms and has a terminal $CH_2=C$ group, said chlorine-containing vinyl resin consisting of a copolymer of 80 to 97% vinyl chloride and 3 to 20% of a diester of fumaric acid.

9. A composition of matter comprising a chlorine-containing vinyl resin and from 1 to 6% by weight, based on said resin, of triallyl phosphite, said chlorine-containing vinyl resin consisting of a copolymer of 80 to 97% vinyl chloride and 3 to 20% of diethyl fumarate.

10. A method for retarding the discoloration of a chlorine-containing vinyl resin which comprises mixing a chlorine-containing vinyl resin of 14 to 75% by weight chlorine in which the chlorine is attached directly to the carbon atoms in the polymer chain with from 1 to 6% by weight, based on said resin, of a tri-(2-alkenyl)phosphite having 3 to 14 carbons in each alkenyl group, milling said mixture of resin and phosphite at a temperature of 100° to 160° C. and removing the resin from said milling temperature substantially as soon as it is homogenized.

11. A method for retarding the discoloration of a chlorine-containing vinyl resin which comprises mixing a vinyl chloride resin with from 1 to 6% by weight, based on said resin, of triallyl phosphite, milling said mixture of resin and phosphite at a temperature of 100° to 160° C. and removing the resin from said milling temperature substantially as soon as it is homogenized.

RICHARD H. WILEY.

No references cited.